US010754670B2

(12) United States Patent
Kevorkian

(10) Patent No.: US 10,754,670 B2
(45) Date of Patent: Aug. 25, 2020

(54) DYNAMIC USER INTERFACE FOR PREDICTIVE DATA ANALYTICS

(71) Applicant: Business Objects Software Limited, Dublin (IE)

(72) Inventor: Gabriel Kevorkian, Sursenes (FR)

(73) Assignee: Business Objects Software Limited, Dublin (IE)

( * ) Notice: Subject to any disclaimer, the term of this patent is extended or adjusted under 35 U.S.C. 154(b) by 97 days.

(21) Appl. No.: 15/841,120

(22) Filed: Dec. 13, 2017

(65) Prior Publication Data
US 2019/0179648 A1   Jun. 13, 2019

(51) Int. Cl.
  *G06F 3/048*   (2013.01)
  *G06F 9/451*   (2018.01)
  *G06N 20/00*   (2019.01)
  *G06F 16/2458* (2019.01)

(52) U.S. Cl.
  CPC ......... *G06F 9/451* (2018.02); *G06F 16/2465* (2019.01); *G06F 2216/03* (2013.01); *G06N 20/00* (2019.01)

(58) Field of Classification Search
  CPC .. G06F 9/451; G06F 16/2465; G06F 2216/03; G06N 20/00
  See application file for complete search history.

(56) References Cited

U.S. PATENT DOCUMENTS

| 5,844,554 A * | 12/1998 | Geller ................. G06F 8/34 715/744 |
| 2003/0106049 A1* | 6/2003 | Ungar ................. G06F 8/427 717/143 |
| 2003/0226115 A1* | 12/2003 | Wall .................. G06F 17/243 715/210 |
| 2007/0094220 A1* | 4/2007 | McCaffrey ........... G06N 7/005 706/52 |
| 2007/0142954 A1* | 6/2007 | Wu ................. G05B 19/40937 700/116 |
| 2007/0168917 A1* | 7/2007 | Janson ................. G06F 8/38 717/101 |
| 2007/0220063 A1* | 9/2007 | O'Farrell ........... G06F 17/277 |
| 2008/0244491 A1* | 10/2008 | Ganesan ............ G06F 17/5031 716/100 |
| 2011/0087700 A1* | 4/2011 | Lo .................. G06F 16/2465 707/776 |
| 2014/0033314 A1* | 1/2014 | Wibbeler ............ G06F 21/52 726/26 |

(Continued)

*Primary Examiner* — Haoshian Shih
(74) *Attorney, Agent, or Firm* — Mintz Levin Cohn Ferris Glovsky and Popeo, P.C.

(57) ABSTRACT

A method for configuring an algorithm for processing data in a database may include generating a plurality of rules by converting a concrete syntax representation of one or more constraints associated with a parameter of the algorithm into an abstract syntax representation of the constraints. A first input value associated with the first parameter may be received from a client via a user interface at the client. The user interface may be updated based on the first input value. The user interface may be updated by applying a first rule from the plurality of rules. The update to the user interface may include a change to a visibility, a modifiability, and/or an allowed value of a second parameter of the algorithm. Related systems and articles of manufacture, including computer program products, are also provided.

20 Claims, 8 Drawing Sheets

(56) References Cited

U.S. PATENT DOCUMENTS

| | | | |
|---|---|---|---|
| 2015/0277899 A1* | 10/2015 | Hamby | G06F 8/41 |
| | | | 717/120 |
| 2015/0379430 A1* | 12/2015 | Dirac | G06N 20/00 |
| | | | 706/12 |
| 2016/0078361 A1* | 3/2016 | Brueckner | H04L 67/10 |
| | | | 706/12 |
| 2016/0110657 A1* | 4/2016 | Gibiansky | G06N 20/00 |
| | | | 706/12 |
| 2018/0232259 A1* | 8/2018 | Chowdhury | G06F 9/5038 |

\* cited by examiner

DYNAMIC USER INTERFACE FOR PREDICTIVE DATA ANALYTICS

TECHNICAL FIELD

The subject matter described herein relates generally to data analytics and more specifically to dynamically generated user interfaces for a predictive analytics controller.

BACKGROUND

Data analytics may refer to the processing of voluminous and/or complex datasets to uncover insights from the underlying data including, for example, patterns, correlations, trends, and/or the like. For example, processing a dataset may include subjecting the dataset to one or more algorithms including, for example, various machine learning algorithms, data mining algorithms, and/or the like. The algorithms may be applied to the dataset in a sequence that corresponds to a directed acyclic graph (DAG). As such, the output and/or results, from one or more earlier algorithms in the directed acrylic graph, may be further processed by one or more subsequent algorithms in the directed acyclic graph.

SUMMARY

Systems, methods, and articles of manufacture, including computer program products, are provided for providing dynamic user interfaces for predictive data analytics. In one aspect, there is provided a system. The system may include at least one data processor and at least one memory. The at least one memory may store instructions that result in operations when executed by the at least one data processor. The operations may include: generating a plurality of rules by at least converting a concrete syntax representation of one or more constraints into an abstract syntax representation of the one or more constraints, the one or more constraints being associated with a first parameter of an algorithm for processing data in a database; receiving, from a client, a first input value associated with the first parameter, the first input value received via a user interface at the client; and updating the user interface based at least on the first input value associated with the first parameter, the user interface updated by at least applying a first rule from the plurality of rules, and the update to the user interface comprising a change to a visibility, a modifiability, and/or an allowed value of a second parameter of the algorithm for processing data in the database.

In some variations, one or more features disclosed herein including the following features can optionally be included in any feasible combination. The update to the user interface may further include another change to the visibility, the modifiability, and/or the allowed value of a third parameter of the algorithm.

In some variations, the first rule may indicate that the second parameter is invisible in the user interface based on the first input value associated with the first parameter. The update to the user interface may include excluding the second parameter from the updated user interface.

In some variations, the first rule may indicate that the second parameter is visible based on the first input value associated with the first parameter. The update to the user interface may include including the second parameter in the updated user interface.

In some variations, the first rule may indicate that the second parameter unmodifiable based at least on the first input value associated with the first parameter. The update to the user interface may include setting the second parameter to one or more fixed values in the updated user interface.

In some variations, the first rule may indicate one or more allowed values for the second parameter based on the first input value associated with the first parameter. The update to the user interface may include including the one or more allowed values for the second parameter in the updated user interface and/or excluding one or more disallowed values for the second parameter from the updated user interface.

In some variations, a second input value associated with the second parameter may be received from the client. The second input value may be received via the user interface and/or the updated user interface. The second input value may be validated by at least applying a second rule from the plurality of rules. The second rule may indicate a validity of the second input value based at least on the first input value associated with the first parameter In some variations, the concrete syntax representation of the one or more constraints may include a JavaScript Object Notation (JSON) and/or an Extensible Markup Language (XML). The algorithm may include a machine learning algorithm and/or a data mining algorithm.

In some variations, the user interface may be generated to include one or more input fields for receiving, from a user at the client, the first input value associated with the first parameter.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to web application user interfaces, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Data analytics may require the application of a variety of machine learning algorithms and/or data mining algorithms including, for example, regression, clustering, classification, dimensionality reduction, time series forecasting, and/or the like. But before an algorithm can be applied to process a dataset, a user may be required to configure the algorithm including by specifying various parameters associated with the algorithm. For example, for a regression algorithm, a user may be required to specify a selection strategy for determining which variables are preserved and/or discarded when generating a regression model of the dataset. As such, an analytics controller may be configured to generate a user interface that enables a user to configure an algorithm for processing a dataset.

In some example embodiments, the user interface generated by the analytics controller may be configured to receive, from the user, one or more input values associated with at least a first parameter associated with the algorithm. The input values associated with the first parameter may change the visibility, modifiability, and/or allowed values for a second parameter associated with the algorithm. Accordingly, the analytics controller may update the user interface based at least on the visibility, modifiability, and/or allowed values for the second parameter.

Figure 1A:
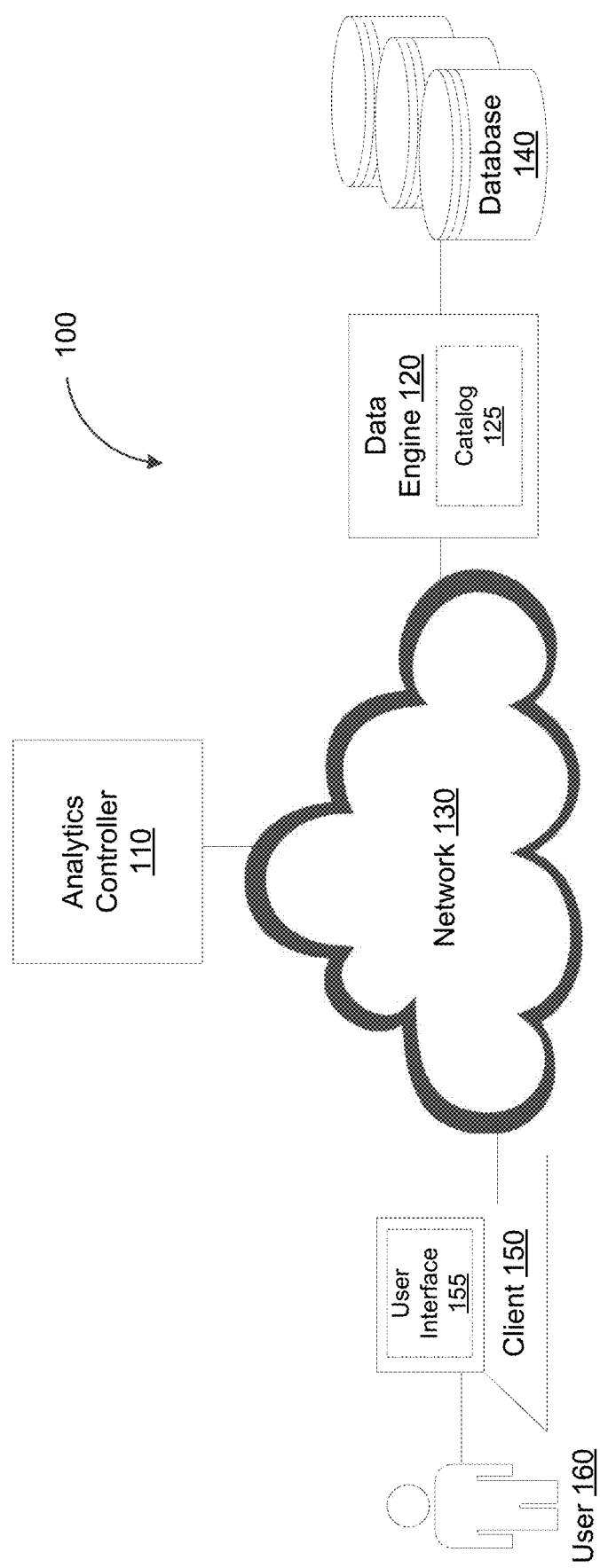
FIG. 1A depicts a system diagram illustrating a data analytics system, in accordance with some example embodiments.

FIG. 1A depicts a system diagram illustrating a data analytics system 100, in accordance with some example embodiments. Referring to FIG. 1A, the data analytics system 100 may include an analytics controller 110, a data controller 120, and a client 150. The analytics controller 110 may be communicatively coupled, via a network 130, with the data controller 120 and the client 150. The network 130 may be a wired and/or wireless network including, for example, a wide area network (WAN), a local area network (LAN), a virtual local area network (VLAN), a public land mobile network (PLMN), the Internet, and/or the like.

The data controller 120 may be coupled with a database 140, which may be any type of database including, for example, an in-memory database, a relational database, a non-SQL (NoSQL) database, and/or the like. In some example embodiments, the data controller 120 may support one or more algorithms for processing the data held in the database 140. That is, the data controller 120 may be capable of performing one or more algorithms on the data held in the database 140. As shown in FIG. 1A, the data controller 120 may include a catalog 125, which may include a description and/or definition for each of the algorithms supported by the data controller 120. For example, the data controller 120 may support one or more machine learning algorithms and/or data mining algorithms including, for example, regression, clustering, classification, dimensionality reduction, time series forecasting, and/or the like. Processing the data held in the database 140, including by applying one or more machine learning algorithms and/or data mining algorithms, may reveal insights from the data including, for example, patterns, correlations, trends, and/or the like.

A user 160 associated with the client 150 may wish to process at least a portion of the data held in the database 140 by at least applying, to the data, one or more of the algorithms supported by the data controller 120. In order to apply an algorithm (e.g., machine learning algorithm, data mining algorithm, and/or the like) to the data held in the database 140, the user 160 may be required to configure the algorithm, for example, by specifying one or more parameters associated with the algorithm. As such, in some example embodiments, the analytics controller 110 may be configured to generate a user interface 155 that enables the user 160 to configure the algorithm. For instance, the user interface 155 may be displayed at the client 150. Furthermore, the user interface 155 may be configured to receive, from the user 160, one or more input values that specify the parameters associated with the algorithm. For example, the user interface 155 may be configured to receive, from the user 160, a selection strategy for a regression algorithm. As noted, the selection strategy may determine which variables are preserved and/or discarded when generating a regression model of at least a portion of the data held in the database 140.

According to some example embodiments, the user interface 155 may be dynamic. That is, the analytics controller 110 may be configured to update the user interface 155 based at least on input values received from the user 160 via the user interface 155. For example, the user 160 may provide, via the user interface 155, one or more input values associated with a first parameter associated with an algorithm. These input values associated with the first parameter of the algorithm may change the visibility of a second parameter associated with the same algorithm. That is, the input values associated with the first parameter may render the second parameter irrelevant and may therefore determine whether the second parameter is included in the updated user interface 155. Alternatively and/or additionally, the input values associated with the first parameter may change the modifiability of the second parameter. Here, the input values associated with the first parameter may set the second parameter to one or more fixed values that cannot be altered by the user 160. The input values associated with the first parameter may also determine the allowed values for the second parameter. For example, based on the input values associated with the first parameter, the acceptable input values for the second parameter may be limited to, for example, a closed list of values, a closed range of values, and/or the like.

In some example embodiments, the analytics controller 110 may update the user interface 155 to reflect the changes to the visibility, modifiability, and/or allowed values for the second parameter. For example, the user interface 155 may be updated to include and/or exclude the second parameter based on a relevance of the second parameter as determined by the input value associated with the first parameter. Alternatively ad/or additionally, the user interface 155 may be updated to set the second parameter to one or more fixed values, in the event the input values associated with the first parameter renders the second parameter unmodifiable. Where the input values associated with the first parameter limits the second parameter to certain allowed values, the user interface 155 may be updated to include one or more allowed values for the second parameter and/or one or more disallowed values for the second parameter. The updated user interface 155 may be displayed at the client 150 such that the user 160 may be able to provide additional input values required to complete the configuration of the algorithm. Once the configuration of the algorithm is complete, the data controller 120 may perform the algorithm, in accordance with the parameters configured by the user 160, on at least a portion of the data stored at the database 140. For example, the algorithm may be performed by executing one or more database queries that operate on at least the portion of the data stored at the database 140.

Figure 2A:
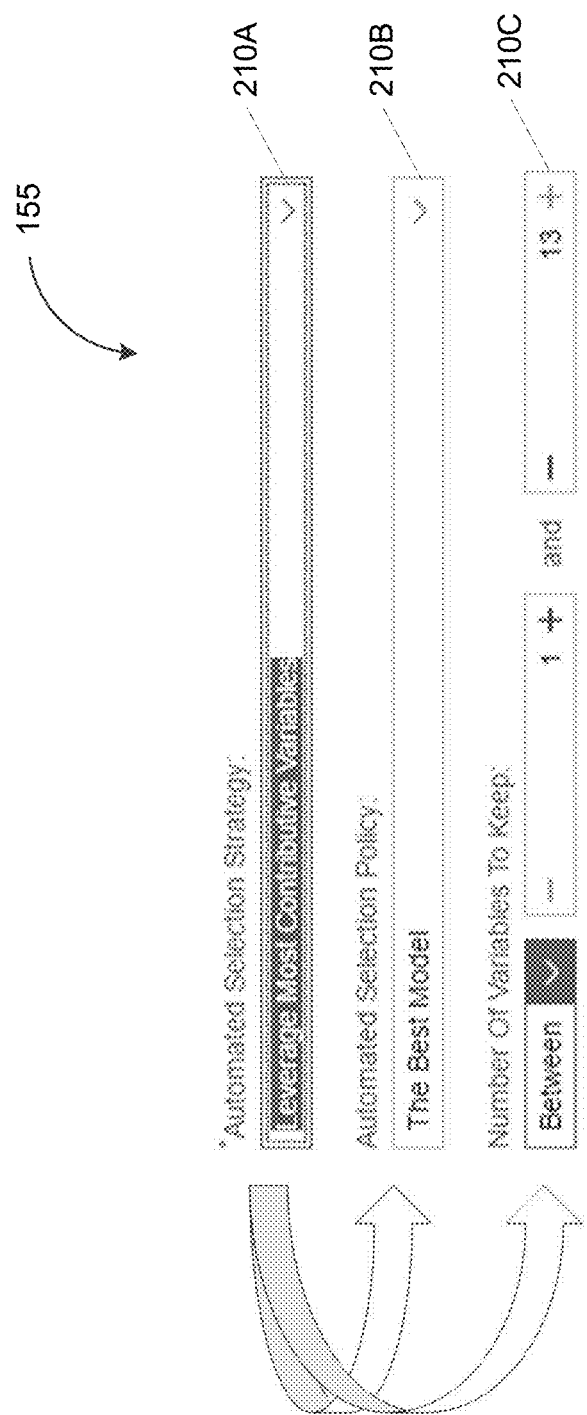
FIG. 2A depicts an example of a user interface for configuring an algorithm, in accordance with some example embodiments.

To further illustrate, FIG. 2A depicts an example of the user interface 155 for configuring an algorithm, in accordance with some example embodiments. As noted, the analytics controller 110 may generate the user interface 155 for configuring an algorithm for processing at least a portion of the data held at the database 140 such as, for example, a machine learning algorithm, a data mining algorithm, and/or the like. Moreover, the user interface 155 may be dynamically updated by the analytics controller 110, for example, based on input values from the user 160 associated with one or more parameters of the algorithm. For example, as shown in FIG. 2A, the user interface 155 may include a plurality of input fields for specifying the parameters of the algorithm including, for example, a first input field 210A (e.g., for specifying an "Automated Selection Strategy" parameter), a second input field 210B (e.g., for specifying an "Automated Selection Policy" parameter), and a third input field 210C (e.g., for specifying a "Number of Variables to Keep" parameter). In some example embodiments, the visibility of the second input field 210B and/or the third input field 210C may be determined by the input values received via the first input field 210A. For instance, the analytics controller 110 may update the user interface 155 to include the second input field 210B and/or the third input field 210C if, for example, a value is received from the user 160 via the first input field 210A. Alternatively and/or additionally, the analytics controller 110 may update the user interface 155 to include the second input field 210B and/or the third input field 210C if a predetermined value (e.g., "Leverage Most Contributive Variables") is received from the user 160 via the first input field 210A. By contrast, the analytics controller 110 may update the user interface 155 to exclude the second input field 210B and/or the third input field 210C if no value and/or a value other than the predetermined value is received from the user 160 via the first input field 210A.

Figure 2B:
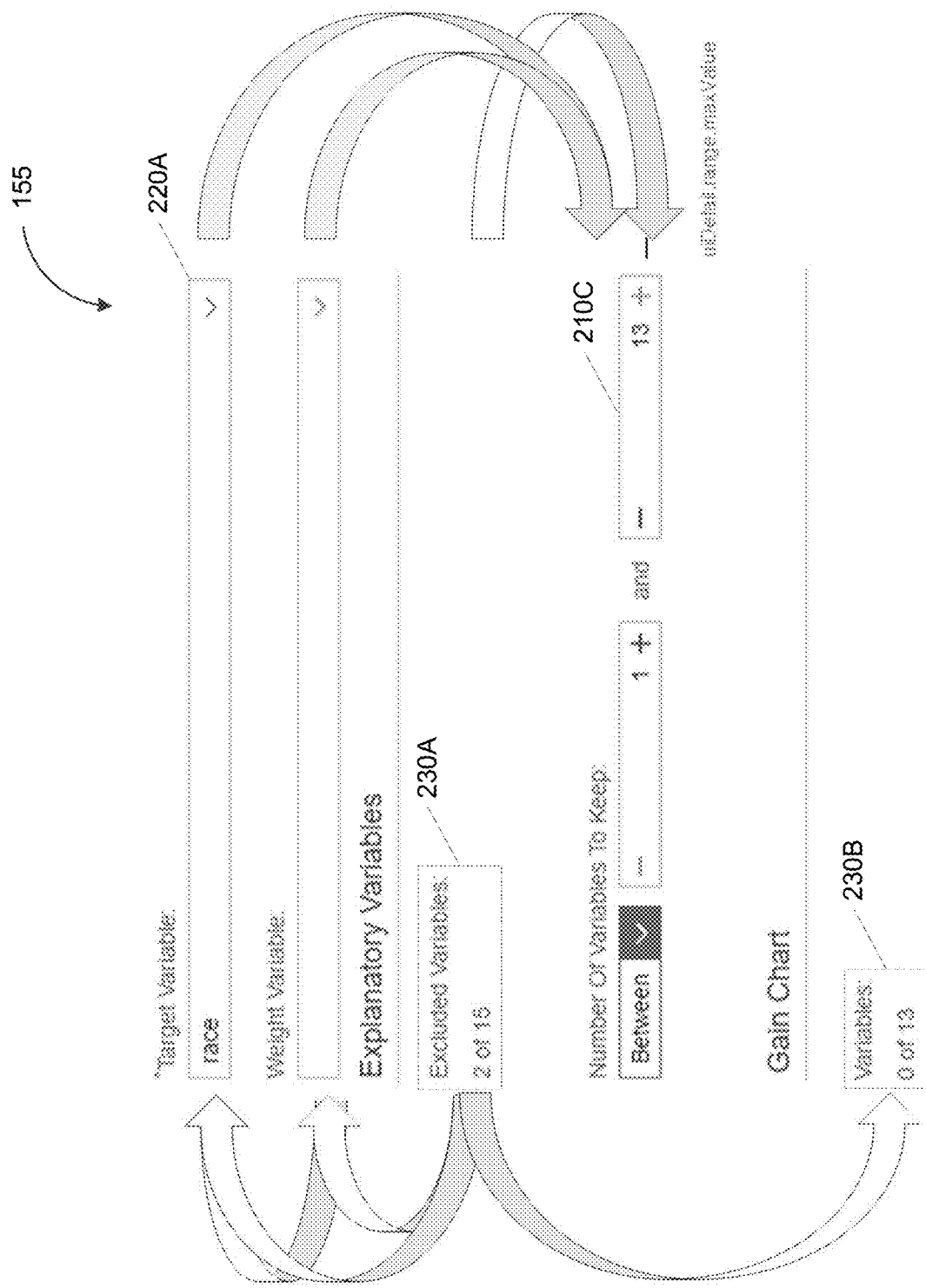
FIG. 2B depicts another example of a user interface for configuring an algorithm, in accordance with some example embodiments.

FIG. 2B depicts another example of the user interface 155 for configuring an algorithm, in accordance with some example embodiments. In some example embodiments, the user 160 may provide, via the user interface 155, input values for one or more parameters of the algorithm that determines the allowed values for one or more other parameters of the algorithm. As shown in FIG. 2B, input values associated with a single parameter of the algorithm may determine the allowed values for multiple other parameters of the algorithm.

For instance, as shown in FIG. 2B, the user 160 may set, via a fourth input field 220, one variable (e.g., "race") from a set of sixteen variables as a target variable. Meanwhile, the user 160 may exclude two variables from the remaining fifteen variables such that thirteen variables remain as possible "Explanatory Variables." Doing so may change the allowed values for a first parameter 230A (e.g., "Excluded Variables") and/or a second parameter 230B (e.g., "Variables") of the algorithm. Accordingly, the analytics controller 110 may update the user interface 155 to reflect these changes to the allowed values for the first parameter 230A and/or the second parameter 230B. For example, the analytics controller 110 may update the user interface 155 to display, for the first parameter 230A, a corresponding quantity of excluded variables (e.g., "2 of 15"). Alternatively and/or additionally, the analytics controller 110 may update the user interface 155 to display, for the second parameter 230B, a corresponding quantity of the remaining explanatory variables. Furthermore, the analytics controller 110 may also update the user interface 155 such that the maximum quantity that can be input into the third input field 210C corresponds to the quantity of remaining explanatory variables (e.g., 13).

Figure 2C:
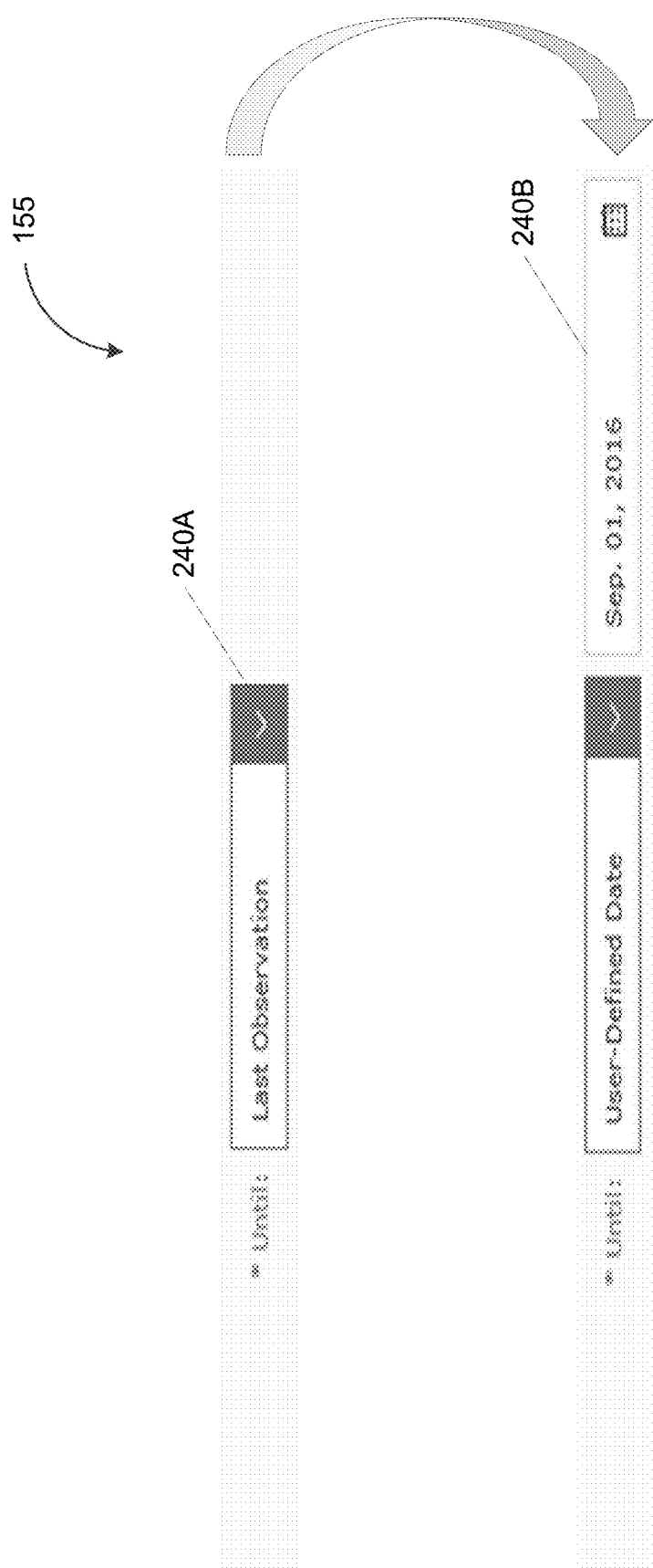
FIG. 2C depicts an example of a user interface that includes mutually exclusive controls, in accordance with some example embodiments.

In some example embodiments, the user interface 155 may include one or more mutually exclusive controls in which an input value for one parameter may determine whether the user interface 155 may be updated to include additional parameters. To further illustrate, FIG. 2C depicts an example of the user interface 155 that includes a mutually exclusive control, in accordance with some example embodiments. Referring to FIG. 2C, the user 160 may provide, via a fifth input field 240A, an input value for a "Until" parameter of the algorithm. Based on the input value for the "Until" parameter, the analytics controller 110 may update the user interface 155 to include a sixth input field 240B. For instance, if the input value for the "Until" parameter is "User-Defined Date," then the analytics controller 110 may update the user interface 155 to include the sixth input field 240B, which may be configured to receive an input value corresponding to a date. Alternatively and/or additionally, the sixth input field 240B may be omitted from the user interface 155 if the input value for the "Until" parameter is "Last Observation."

In some example embodiments, the analytics controller 110 may also validate the input values received via the user interface 155. That is, instead of and/or in addition to updating the user interface 155 to reflect the visibility, modifiability, and/or allowed values for the second parameter based on input values for the first parameter, the analytics controller 110 can validate the input values received for the second parameter such that these input values conform to the visibility, modifiability, and/or allowed values for the second parameter. For example, the analytics controller 110 may disregard input values for the second parameter if input values for the first parameter renders the second parameter irrelevant. Alternatively and/or additionally, one input values associated with the first parameter may set the second parameter to one or more fixed values. As such, the analytics controller 110 may set the second parameter to these fixed values and/or generate an error message (e.g., shown via the user interface 155) if the input values for the second parameter do not match the fixed value. Furthermore, some input values associated with the first parameter may limit the second parameter to certain allowed values (e.g., a closed list of values, a closed range of values, and/or the like). Here, the analytics controller 110 may also generate an error message (e.g., shown via the user interface 155) if the input values for the second parameter are not consistent with the allowed values for the second parameter.

The analytics controller 110 may update the user interface 155 and/or validate the input values received via the user interface 155 by applying one or more rules. As such, in some example embodiments, the analytics controller 110 may generate, based on the catalog 125 of the data controller 120, a plurality of rules including, for example, rules for updating the user interface 155, rules for validating input values received via the user interface 155, and/or the like. In some example embodiments, each rule may be associated with a source parameter and one or more target parameters. The rule may specify, for example, one or more changes to the source parameter and one or more corresponding changes to the target parameters. For instance, the rule may indicate one or more input values associated with the source parameter and the corresponding changes to the visibility, modifiability, and/or allowed values of the one or more target parameters.

The catalog 125 may provide a concrete syntax representation of the constraints associated with the parameters of each algorithm supported by the data controller 120. According to some example embodiments, the analytics controller 110 may generate at least one user interface update rule and/or input validation rule by at least converting the concrete syntax representation of the constraints into an abstract syntax representation of the same constraints.

As used herein, the abstract syntax representation of the constraints may provide the structure of underlying programming language but may omit syntactic features such as, for example, parentheses, commas, and/or the like. For example, the abstract syntax representation of the constraints may be an abstract syntax tree (AST). It should be appreciated that the abstract representation of the constraints may be programming language independent. That is, the abstract syntax representation of the constraints may describe the constraints as a data type, independent of any particular representation or encoding. By contrast, the corresponding concrete syntax representation of the constraints may include the syntactic features absent from the abstract syntax representation. For instance, while the abstract syntax representation of the constraints may include a comparison expression and/or a comparison operator, the concrete syntax representation of the constraints may specify that the symbols and/or strings representing different operators (e.g., the string "=" represents the equals operator). Moreover, the concrete syntax representation of the constraints may specify the relationship between two or more parameters. In some example embodiments, the concrete syntax representation of the constraints may be in JavaScript Object Notation (JSON), Extensible Markup Language (XML), and/or the like.

Figure 3:
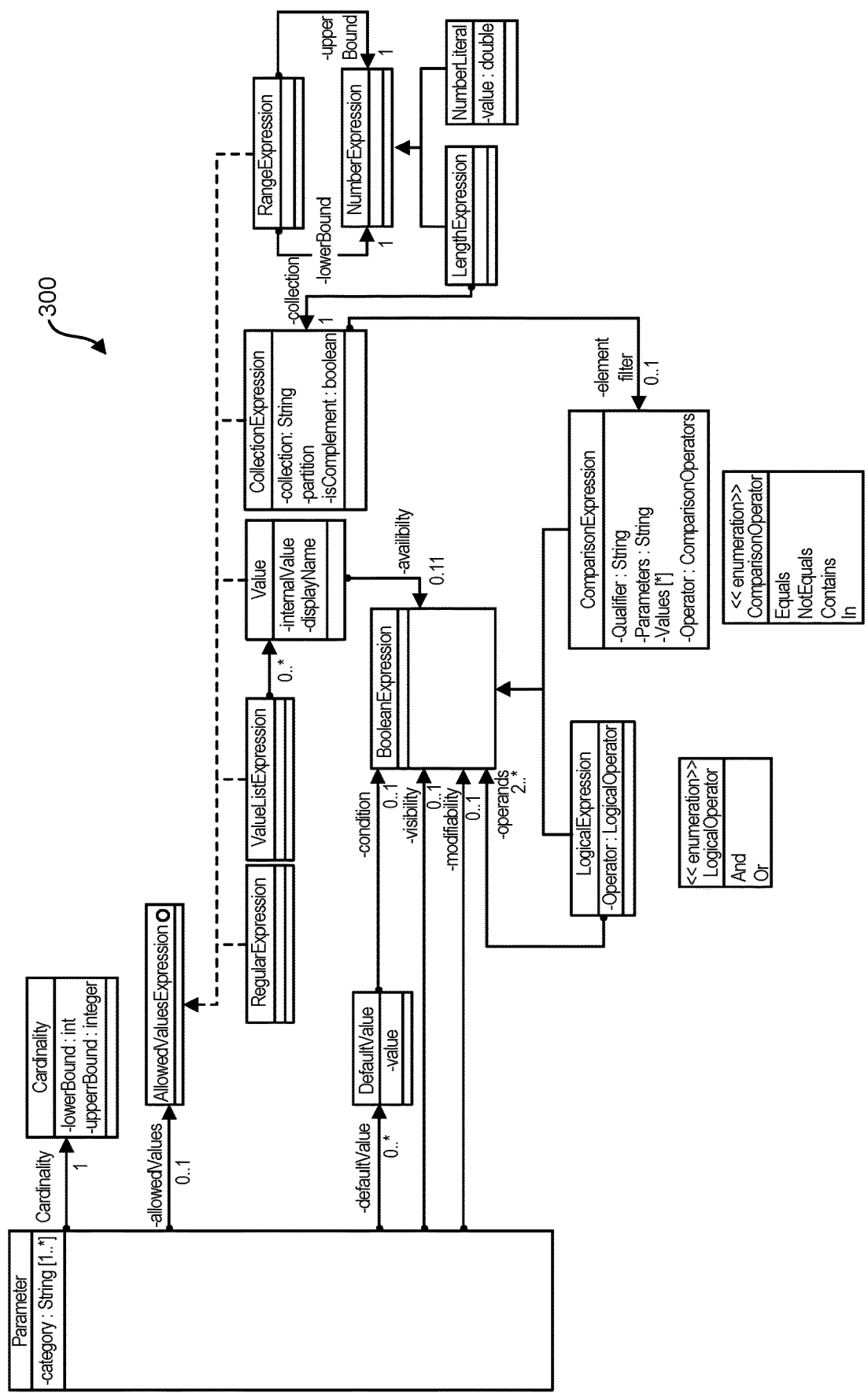
FIG. 3 depicts an expression model for specifying one or more constraints associated the parameters of an algorithm, in accordance with some example embodiments.

To further illustrate, FIG. 3 depicts an expression model 300 specifying one or more constraints associated with a parameter of an algorithm, in accordance with some example embodiments. Referring to FIG. 3, the expression model 300 may be an example of an abstract syntax representation of the constraints associated with the parameter of the algorithm.

Meanwhile, Table 1 below depicts an example of a concrete syntax representation of the constraints of associated with the "Model Selection Policy" parameter. As shown in Table 1, the concrete syntax representation of the constraints associated with the "Model Selection Policy" parameter may be in Java and/or another programming language. The rule associated with the "Model Selection Policy" parameter may specify the relationship between that parameter and one or more other parameters of the algorithm. For instance, the visibility of the "Model Selection Policy" parameter may depend on at least one input value being provided for the "Automated Selection Strategy" parameter. Alternatively and/or additionally, the modifiability and/or the allowed values for the "Model Selection Policy" parameter may also depend on the input values provided for one or more other parameters of the algorithm.

TABLE 1

{
   "name": "APLRegression"
   "parameters": [{
      "name": "AutomatedSelectionStrategy",
      "displayName": "Use Automated Selection",
      "allowedValues": "{none, leverageMostContributiveVars}",
      "defaultValue": "false"
   }, {
      "name": "ModelSelectionPolicy",
      "displayName": "Automated Selection Policy",
      "visibility":
"AutomatedSelectionStrategy=leverageMostContributiveVars",
      "allowedValues": "{lastModel, bestModel}"
   },
   ...
   ],
   ...
}, Table 2 below depicts a concrete syntax representation of the constraints associated with an "Until Last Observation" parameter and an example of the constraints associated with an "Until User Defined Date" parameter. The parameters associated with the "Until Last Observation" parameter and the "Until User Defined Dater" parameter may implement a mutually exclusive control, as shown in FIG. 2C. For instance, both parameters include a "setMutexGroup" constraint, which may be set to the value "Until." As such, the input value associated with "Until" may determine whether the user interface 155 may be updated to include additional input fields (e.g., the sixth input field 240B).

TABLE 2

Figure 1B:
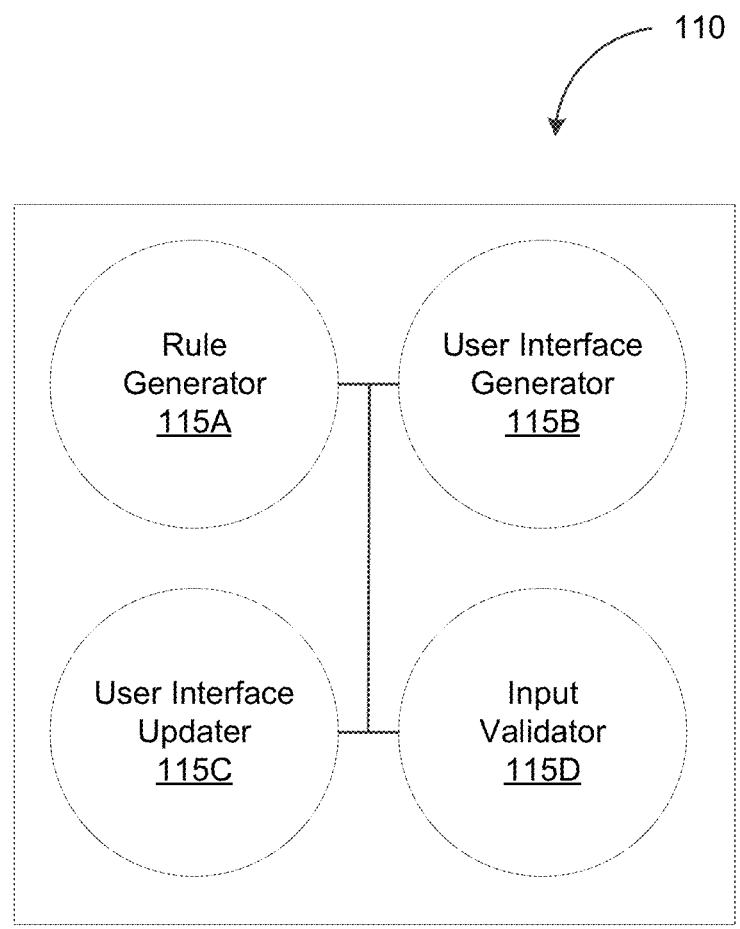
FIG. 1B depicts a block diagram illustrating an analytics controller, in accordance with some example embodiments.

{
   "name": "APLTimeSeries"
   "parameters": [{
      "name": "UntilLastObservation",
      "type": "Boolean",
      "cardinality": "1"
      "allowedValues": "{true}"
      "defaultValue": "true"
      "mutexGroup": "Until"
   }, {
      "name": "UntilUserDefinedDate",
      "type": "Date",
      "cardinality": "1"
      "mutexGroup": "Until"
   },
   ...
   ],
   ...
}, FIG. 1B depicts a block diagram illustrating the analytics controller 110, in accordance with some example embodiments. Referring to FIGS. 1A-B, the analytics controller 110 may include a rule generator 115A, a user interface generator 115B, a user interface updater 115C, and an input validator 115D. It should be appreciated that the analytics controller 110 may include additional and/or different components than shown in FIG. 1B.

In some example embodiments, the rule generator 115A may be configured to generate one or more rules applied by the rule generator 115A including, for example, rules for updating the user interface 155, rules for validating input values received via the user interface 155, and/or the like. The user interface update rules and/or the input validation rules may be generated based on an abstract syntax representation of the constraints associated with the parameters of each algorithm supported by the data controller 120. As such, to generate a rule for a parameter associated with an algorithm, the rule generator 115A may convert the concrete syntax representation of the constraints provided by the catalog 125 into the abstract syntax representations of the same constraints.

The user interface generator 115B may be configured to generate the user interface 155, which may be displayed at the client 150. As noted, the user interface 155 may be configured to receive, from the user 160, one or more input values for configuring an algorithm for processing at least a portion of the data held at the database 140. Moreover, the user interface 155 may be dynamic such that the input values provided by the user 160 via the user interface 155 associated with one parameter of the algorithm may determine the visibility, modifiability, and/or allowed values of one or more other parameters of the algorithm.

In some example embodiments, the rules generated by the rule generator 115A may be deployed at the analytics controller 110 and accessed by the client 150 remotely, for example, as a web application and/or a cloud service (e.g., Software as a Service (Saas)). Accordingly, in some example embodiments, the user interface updater 115C may be configured to update the user interface 155, for example, based on input values received via the user interface 155. As noted, the user interface updater 115C may update the user interface 115 in accordance with one or more rules generated by the rule generator 115A. For instance, as shown in FIGS. 2A-B, the user interface updater 115C may update the user interface 155 to reflect changes in the visibility, modifiability, and/or allowed values of one or more parameters of the algorithm, which may be triggered by input values associated with other parameters of the algorithm. Moreover, in some example embodiments, the input validator 115D may be configured to validate the input values received via the user interface 155, for example, based on the rules generated by the rule generator 115A. As noted, instead of and/or in addition to updating the user interface 155 to reflect the visibility, modifiability, and/or allowed values for a parameter, the input validator 115D can validate the input values received for a parameter such that these input values conform to the visibility, modifiability, and/or allowed values for that parameter.

Alternatively and/or additionally, the rules generated by the rule generator 115A may be deployed locally at the client 150. For example, at least some of the rules generated by the rule generator 115A may be sent to the client 150. As such, the updates to the user interface 155 and/or the validation of the inputs received via the user interface 155 may be performed, at least partially, at the client 150 instead of and/or in addition to be performed remotely at the analytics controller 110.

Figure 4:
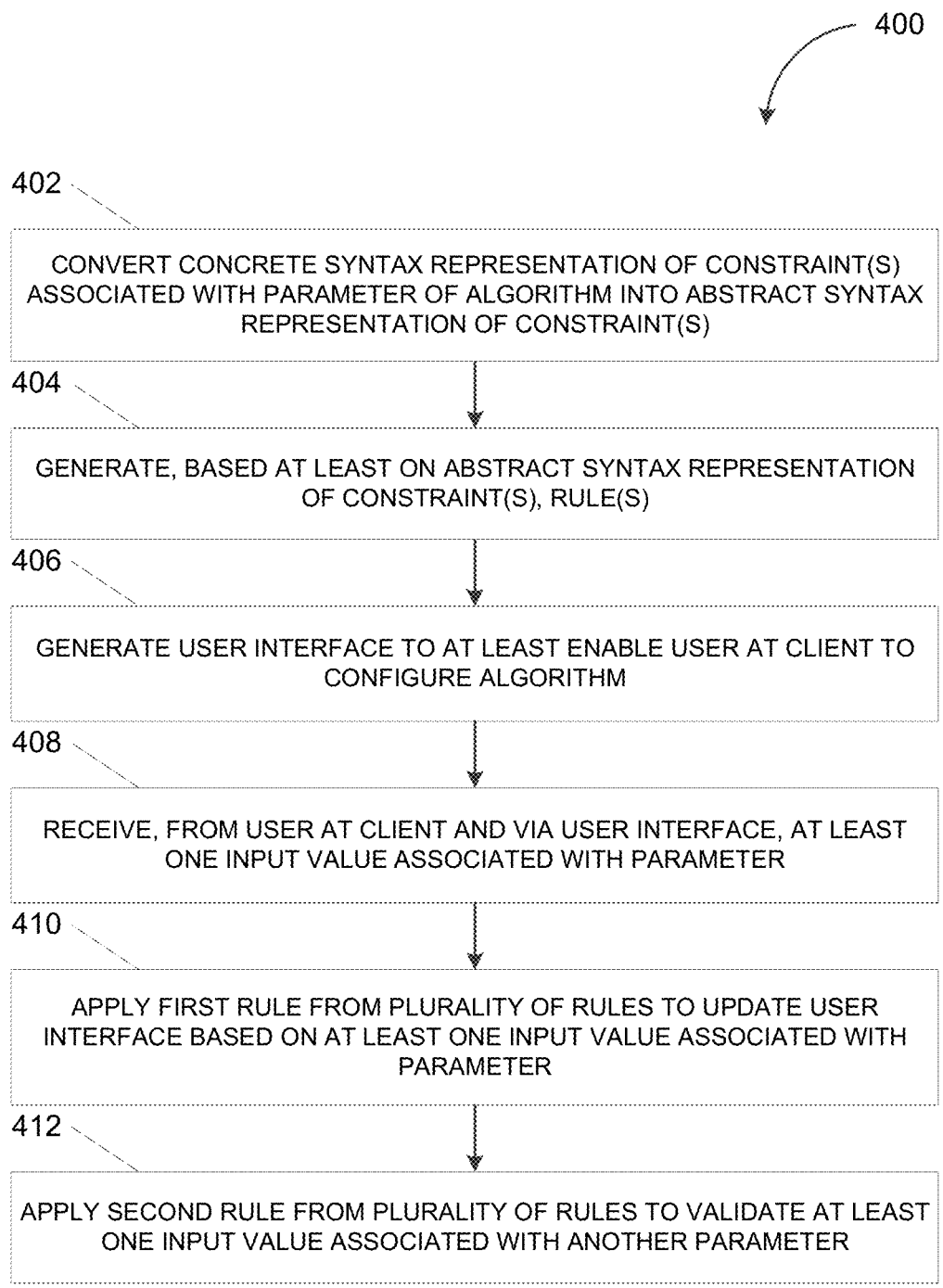
FIG. 4 depicts a flowchart illustrating a process for configuring an algorithm, in accordance with some example embodiments.

FIG. 4 depicts a flowchart illustrating a process 400 for configuring an algorithm, in accordance with some example embodiments. Referring to FIGS. 1-4, the process 400 may be performed by the analytics controller 110.

At 402, the analytics controller 110 may convert a concrete syntax representation of one or more constraints associated with a parameter of an algorithm into an abstract syntax representation of the one or more constraints. As noted, the catalog 125 of the data engine 120 may provide a concrete syntax representation of the constraints associated with the parameters of each algorithm supported by the data controller 120. The concrete syntax representation of the constraints may include the syntactic features absent from the abstract syntax representation. Furthermore, the concrete syntax representation of the constraints may specify the relationship between two or more parameters. By contrast the corresponding abstract syntax representation of the constraints may provide the structure of underlying programming language but may omit syntactic features such as, for example, parentheses, commas, and/or the like.

As such, in order to generate one or more user interface update rules and/or input validation rules, the analytics controller 110 may convert the concrete syntax representation of the constraints into an abstract syntax representation of the constraints. For example, the concrete syntax representation of the constraints may include the specific symbols and/or strings that are representative of a comparison operation and/or comparison expression such as, for example, equals to, not equal to, greater than, less than, and/or the like. By contrast, the abstract syntax representation of the constraints may include a comparison expression and/or a comparison operator but without any of the corresponding symbols and/or strings. As such, to generate the plurality of rules may include replacing and/or substituting the specific symbols and/or strings that are representative of an operation (e.g., "=", "!=", ">", "<", and/or the like) with the corresponding comparison expression and/or comparison expression (e.g., equals to, not equal to, greater than, less than, and/or the like).

At 404, the analytics controller 110 may generate, based at least on the abstract syntax representation of the one or more constraints, one or more rules. As noted, each rule generated by the analytics controller 110 may be associated with a source parameter and one or more target parameters. The rule may specify, for example, one or more changes to the source parameter and one or more corresponding changes to the target parameters. In some example embodiments, the rule may be a rule for updating the user interface 155. For instance, the rule may specify one or more input values for the source parameter displayed on the user interface 155. The rule may further specify changes to the target parameters displayed on the user interface 155, which may be triggered by the input values for the source parameter. Alternatively and/or additionally, the rule may be a rule for validating the inputs received via the user interface 155. For example, the rule may specify whether the input values for the target parameters received via the user interface 155 are valid based on the input values for the source parameters received via the user interface 155.

At 406, the analytics controller 110 may generate the user interface 155 to at least enable the user 160 at the client 150 to configure the algorithm. For example, as shown in FIGS. 2A-B, the user interface 155 can include a plurality of input fields for specifying the parameters of the algorithm including, for example, the first input field 210A, the second input field 210B, the third input field 210C, and/or the fourth input field 220. Alternatively and/or additionally, the user interface 155 may also display the values associated with one or more parameters of the algorithm including, for example, the first parameter 230A and/or the second parameter 230B. In some example embodiments, the user interface 155 may be displayed at the client 150 in order to enable the user 160 to provide, via the user interface 155, one or more input values associated with the parameters of the algorithm.

At 408, the analytics controller 110 may receive, from the user 160 at the client 150 and via the user interface 155, at least one input value associated with the parameter. To further illustrate, as shown in FIG. 2A, the analytics controller 110 may generate the user interface 155, which may include at least the first input field 210A for specifying the "Automated Selection Strategy" parameter of the algorithm. The user 160 may provide, via the first input field 210A, at least one input value associated with the "Automated Selection Strategy" parameter. Accordingly, the analytics controller 110 may receive, via the user interface 115, the at least one input value associated with the "Automated Selection Strategy" parameter of the algorithm.

At 410, the analytics controller 110 may apply at least a first rule from the plurality of rules to update the user interface 155 based on the at least one input value associated with the parameter. As noted, in some example embodiments, the analytics controller 110 may apply the user interface update rule locally at the analytics controller 110 to update the user interface 155. Alternatively and/or additionally, the analytics controller may apply the user interface update rule by sending the rule to the client 150 where the rule may be applied by the client 150 to update the user interface 155. For instance, in some example embodiments, the input value associated with the "Automated Selection Strategy" parameter may determine the visibility, modifiability, and/or allowed values for one or more other parameters including, for example, the "Automated Selection Policy" parameter and/or the "Number of Variables to Keep" parameter. As noted, the rules generated by the analytics controller 110 may determine what changes to the visibility, modifiability, and/or allowed values of the "Automated Selection Policy" parameter and/or the "Number of Variables to Keep" parameter may be triggered by the input value associated with the "Automated Selection Strategy" parameter. Thus, upon receiving the at least one input value associated with the "Automated Selection Strategy" parameter, the analytics controller 110 may apply at least one rule to update the user interface 150 to reflect the changes to the visibility, modifiability, and/or allowed values of the "Automated Selection Policy" parameter and/or the "Number of Variables to Keep" parameter.

At 412, the analytics controller 110 may apply at least a second rule from the plurality of rules to validate the at least one input value associated with another parameter. For example, instead of and/or in addition to updating the user interface 155 to reflect the visibility, modifiability, and/or allowed values for the second parameter based on the at least one input value associated with the "Automated Selection Strategy" parameter, the analytics controller 110 can also validate the input values received for the "Automated Selection Policy" parameter and/or the "Number of Variables to Keep" parameter such that these input values conform to the visibility, modifiability, and/or allowed values of these parameters as determined by the at least one input value associated with the "Automated Selection Strategy" parameter. As noted, the analytics controller 110 may apply the input validation rule locally at the analytics controller 110 and/or send the input validation rule to the client 150 where the rule is applied by the client 150.

Figure 5:
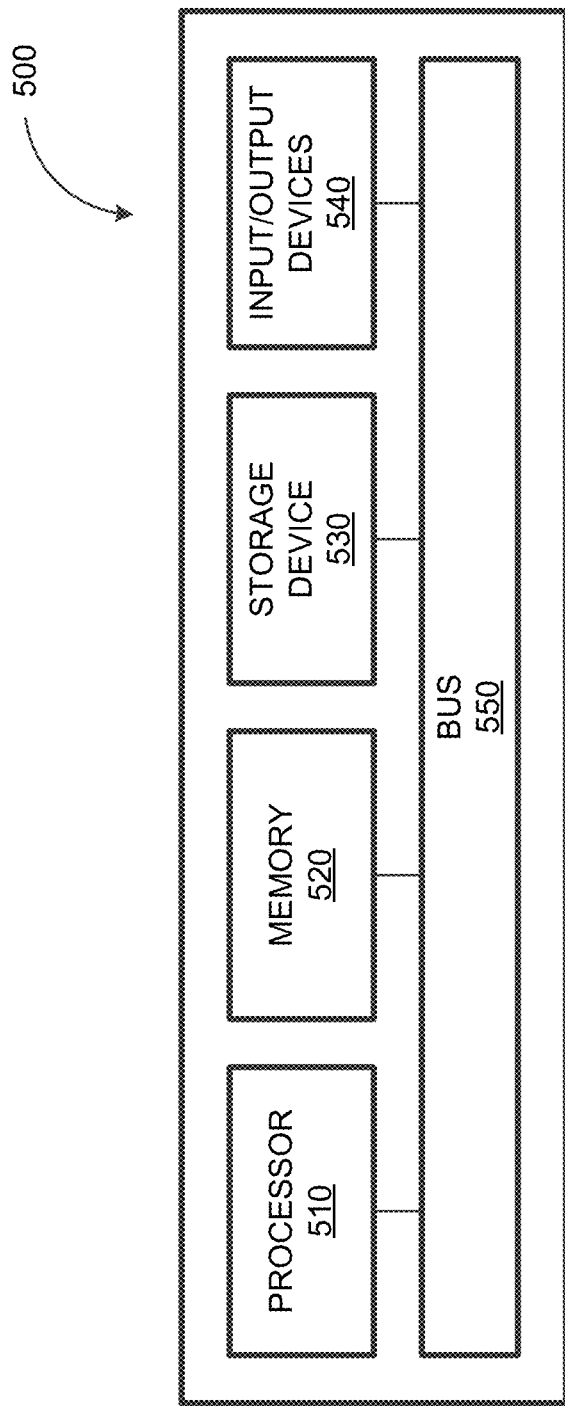
FIG. 5 depicts a block diagram illustrating a computing system, in accordance with some example embodiments.

FIG. 5 depicts a block diagram illustrating a computing system 500 consistent with implementations of the current subject matter. Referring to FIGS. 1 and 5, the computing system 500 can be used to implement the analytics controller 110, the data controller 120, the client 150, and/or any component therein.

As shown in FIG. 5, the computing system 500 can include a processor 510, a memory 520, a storage device 530, and input/output devices 540. The processor 510, the memory 520, the storage device 530, and the input/output devices 540 can be interconnected via a system bus 550. The processor 510 is capable of processing instructions for execution within the computing system 500. Such executed instructions can implement one or more components of, for example, the analytics controller 110, the data controller 120, and/or the client 150. In some example embodiments, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some example embodiments, the input/output device 540 includes a keyboard and/or pointing device. In various implementations, the input/output device 540 includes a display unit for displaying graphical user interfaces.

According to some example embodiments, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some example embodiments, the computing system 500 can be used to execute various interactive computer software applications that can be used for organization, analysis and/or storage of data in various formats. Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning as an add-in for a spreadsheet and/or other type of program) or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
   at least one data processor; and
   at least one memory storing instructions which, when executed by the at least one data processor, result in operations comprising:
   receiving a selection of an algorithm, the algorithm being selected from a plurality of algorithms for processing data in a database, the plurality of algorithms being part of a catalog including a concrete syntax representation of constraints associated with at least one parameter of each of the plurality of algorithms;
   generating, based at least on the catalog, a plurality of rules associated with the selected algorithm, the plurality of rules being generated by at least converting, into an abstract syntax representation, a concrete syntax representation of one or more constraints associated with a first parameter of the selected algorithm for processing data in the database;
   receiving, from a client, a first input associated with the first parameter, the first input value received via a user interface at the client;
   updating the user interface based at least on the first input value associated with the first parameter, the user interface updated by at least applying a first rule from the plurality of rules, the update to the user interface comprising a change to a visibility, a modifiability, and/or an allowed value of a second parameter of the selected algorithm for processing data in the database, the user interface being updated to include a first input field configured to receive a second input associated with the second parameter in response to the first input being a first value, and the user interface being updated to exclude the first input field configured to receive the second input associated with the second parameter in response to the first input being a second value; and performing the selected algorithm having the first parameter and the second parameter, the second parameter having a third value received as the second input or a fourth value retrieved from the database.

2. The system of claim 1, wherein the update to the user interface further comprises another change to the visibility, the modifiability, and/or the allowed value of a third parameter of the selected algorithm.

3. The system of claim 1, wherein the first rule indicates that the second parameter is invisible in the user interface based at least on the first input being the first value.

4. The system of claim 1, wherein the first rule indicates that the second parameter is visible based at least on the first input being the second value.

5. The system of claim 1, wherein the first rule indicates that the second parameter has one or more fixed values based at least on the first input being the second value.

6. The system of claim 1, wherein the first rule indicates one or more allowed values for the second parameter based at least on the first input being the first value, and wherein the update to the user interface includes configuring the first input field to receive a selection of the one or more allowed values for the second parameter.

7. The system of claim 1, further comprising:
receiving, from the client, the second input associated with the second parameter, the second input value received via the first input field in the updated user interface; and
validating the third value of the second input by at least applying a second rule from the plurality of rules, the second rule indicating a validity of the second input based at least on the first input associated with the first parameter.

8. The system of claim 1, wherein the concrete syntax representation of the one or more constraints comprises a JavaScript Object Notation (JSON) and/or an Extensible Markup Language (XML).

9. The system of claim 1, wherein the selected algorithm comprises a machine learning algorithm and/or a data mining algorithm.

10. The system of claim 1, further comprising:
generating the user interface to include a second input field for receiving, from a user at the client, the first input associated with the first parameter.

11. A computer-implemented method, comprising:
receiving a selection of an algorithm, the algorithm being selected from a plurality of algorithms for processing data in a database, the plurality of algorithms being part of a catalog including a concrete syntax representation of constraints associated with at least one parameter of each of the plurality of algorithms;
generating, based at least on the catalog, a plurality of rules associated with the selected algorithm, the plurality of rules being generated by at least converting, into an abstract syntax representation, a concrete syntax representation of one or more constraints associated with first parameter of the selected algorithm for processing data in the database;
receiving, from a client, a first input associated with the first parameter, the first input value received via a user interface at the client;
updating the user interface based at least on the first input value associated with the first parameter, the user interface updated by at least applying a first rule from the plurality of rules, the update to the user interface comprising a change to a visibility, a modifiability, and/or an allowed value of a second parameter of the selected algorithm for processing data in the database, the user interface being updated to include a first input field configured to receive a second input associated with the second parameter in response to the first input being a first value, and the user interface being updated to exclude the first input field configured to receive the second input associated with the second parameter in response to the first input being a second value; and
performing the selected algorithm having the first parameter and the second parameter, the second parameter having a third value received as the second input or a fourth value retrieved from the database.

12. The method of claim 11, wherein the update to the user interface further comprises another change to the visibility, the modifiability, and/or the allowed value of a third parameter of the selected algorithm.

13. The method of claim 11, wherein the first rule indicates that the second parameter is invisible in the user interface based at least on the first input being the first value.

14. The method of claim 11, wherein the first rule indicates that the second parameter is visible based at least on the first input being the second value.

15. The method of claim 11, wherein the first rule indicates that the second parameter has one or more fixed values based at least on the first input being the second value.

16. The method of claim 11, wherein the first rule indicates one or more allowed values for the second parameter based at least on the first input being the first value, and wherein the update to the user interface includes configuring the first input field to receive a selection of the one or more allowed values for the second parameter.

17. The method of claim 11, further comprising:
receiving, from the client, the second input associated with the second parameter, the second input value received via the first input field in the updated user interface; and
validating the third value of the second input by at least applying a second rule from the plurality of rules, the second rule indicating a validity of the second input based at least on the first input associated with the first parameter.

18. The method of claim 11, wherein the concrete syntax representation of the one or more constraints comprises a JavaScript Object Notation (JSON) and/or an Extensible Markup Language (XML).

19. The method of claim 11, wherein the selected algorithm comprises a machine learning algorithm and/or a data mining algorithm.

20. A non-transitory computer readable medium storing instructions, which when executed by at least one data processor, result in operations comprising:
receiving a selection of an algorithm, the algorithm being selected from a plurality of algorithms for processing data in a database, the plurality of algorithms being part of a catalog including a concrete syntax representation of constraints associated with at least one parameter of each of the plurality of algorithms;
generating, based at least on the catalog, a plurality of rules associated with the selected algorithm, the plurality of rules being generated by at least converting, into an abstract syntax representation, a concrete syntax representation of one or more constraints associated with a first parameter of the selected algorithm for processing data in the database;

receiving, from a client, a first input associated with the first parameter, the first input value received via a user interface at the client;

updating the user interface based at least on the first input value associated with the first parameter, the user interface updated by at least applying a first rule from the plurality of rules, the update to the user interface comprising a change to a visibility, a modifiability, and/or an allowed value of a second parameter of the selected algorithm for processing data in the database, the user interface being updated to include a first input field configured to receive a second input associated with the second parameter in response to the first input being a first value, and the user interface being updated to exclude the first input field configured to receive the second input associated with the second parameter in response to the first input being a second value; and performing the selected algorithm having the first parameter and the second parameter, the second parameter having a third value received as the second input or a fourth value retrieved from the database.

\* \* \* \* \*